US010279770B2

(12) United States Patent
Faruque et al.

(10) Patent No.: US 10,279,770 B2
(45) Date of Patent: May 7, 2019

(54) VEHICLE IMPACT ABSORBING SYSTEM INCLUDING CHEST LOAD REDUCTION

(71) Applicant: Ford Global Technologies, LLC, Dearborn, MI (US)

(72) Inventors: Mohammed Omar Faruque, Ann Arbor, MI (US); S. M. Iskander Farooq, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/422,365

(22) Filed: Feb. 1, 2017

(65) Prior Publication Data
US 2018/0215338 A1    Aug. 2, 2018

(51) Int. Cl.
*B60R 21/232* (2011.01)
*B60R 21/0136* (2006.01)
(Continued)

(52) U.S. Cl.
CPC ........ *B60R 21/232* (2013.01); *B60R 21/0136* (2013.01); *B60R 21/214* (2013.01); *B60R 21/2165* (2013.01); *B60R 21/237* (2013.01); *B60R 21/2338* (2013.01); *B60R 21/2342* (2013.01); *B60R 21/23138* (2013.01); *B60R 21/262* (2013.01); *B60R 21/264* (2013.01); *B60R 2021/0004* (2013.01);
(Continued)

(58) Field of Classification Search
CPC ... B60R 21/233; B60R 21/232; B60R 21/214; B60R 2021/23192
See application file for complete search history.

(56) References Cited

U.S. PATENT DOCUMENTS 3,774,936 A * 11/1973 Barnett ................. B60R 21/214
                                                        280/730.1
5,470,103 A * 11/1995 Vaillancourt ......... B60R 21/214
                                                        280/730.1
(Continued)

FOREIGN PATENT DOCUMENTS

CN     204340958 U      5/2015
DE     4212416 A1 * 11/1992 ........... B60R 21/214
(Continued)

OTHER PUBLICATIONS

GB Search Report dated Jul. 10, 2018 re GB Appl. 1801504.0.

*Primary Examiner* — Nicole T Verley
(74) *Attorney, Agent, or Firm* — Frank A. MacKenzie; Bejin Bieneman PLC

(57) ABSTRACT

An airbag for a vehicle includes a top, a bottom, a first panel, and a second panel spaced from the first panel. The airbag includes a first leg, a second leg, and a middle leg. The first leg extends from the first panel in a rearward direction. The second leg extends from the second panel in the rearward direction. The middle leg extends from the first panel and the second panel in the rearward direction. The first panel and the second panel each slant in the rearward direction along a direction from the top to the bottom of the airbag. The first panel and the second panel of the airbag in the inflated position may urge occupants to remain upright during an impact event, reducing loading on a chest of the occupants from seat belt.

19 Claims, 9 Drawing Sheets

(51) Int. Cl.
*B60R 21/214* (2011.01)
*B60R 21/2165* (2011.01)
*B60R 21/231* (2011.01)
*B60R 21/2338* (2011.01)
*B60R 21/2342* (2011.01)
*B60R 21/237* (2006.01)
*B60R 21/262* (2011.01)
*B60R 21/264* (2006.01)
*B60R 21/00* (2006.01)
*B60R 21/01* (2006.01)
*B60R 21/235* (2006.01)

(52) U.S. Cl.
CPC ............... *B60R 2021/0006* (2013.01); *B60R 2021/0009* (2013.01); *B60R 2021/0018* (2013.01); *B60R 2021/0044* (2013.01); *B60R 2021/01013* (2013.01); *B60R 2021/23107* (2013.01); *B60R 2021/23153* (2013.01); *B60R 2021/23161* (2013.01); *B60R 2021/23192* (2013.01); *B60R 2021/23382* (2013.01); *B60R 2021/23386* (2013.01); *B60R 2021/23514* (2013.01); *B60R 2021/23542* (2013.01)

(56) References Cited

U.S. PATENT DOCUMENTS

| | | |
|---|---|---|
| 5,486,019 A | 1/1996 | Chevroulet et al. |
| 6,722,691 B1 * | 4/2004 | Haland .................. B60R 21/16 280/730.1 |
| 7,222,877 B2 * | 5/2007 | Wipasuramonton ........................ B60R 21/214 280/729 |
| 8,087,690 B2 | 1/2012 | Kim |
| 8,807,593 B2 | 8/2014 | Lee et al. |
| 9,321,423 B2 | 4/2016 | Jaradi et al. |
| 9,446,735 B1 | 9/2016 | Jayasuriya et al. |
| 9,676,361 B2 * | 6/2017 | Smith .................. B60R 21/232 |
| 9,725,064 B1 * | 8/2017 | Faruque .................. B60N 2/143 |
| 9,994,182 B1 * | 6/2018 | Jaradi .................. B60R 21/214 |
| 2007/0262572 A1 * | 11/2007 | Fischer ................ B60R 21/231 280/730.1 |
| 2016/0311393 A1 | 10/2016 | Smith et al. |

FOREIGN PATENT DOCUMENTS

| | | | |
|---|---|---|---|
| DE | 102012006511 A1 | 10/2013 | |
| DE | 102015004956 A1 * | 10/2016 | ........... B60R 21/233 |
| DE | 102015008455 A1 * | 1/2017 | ........... B60R 21/233 |
| EP | 2699454 B1 * | 11/2017 | |
| JP | 2008284904 A | 11/2008 | |
| WO | WO-2018012363 A1 * | 1/2018 | |

* cited by examiner

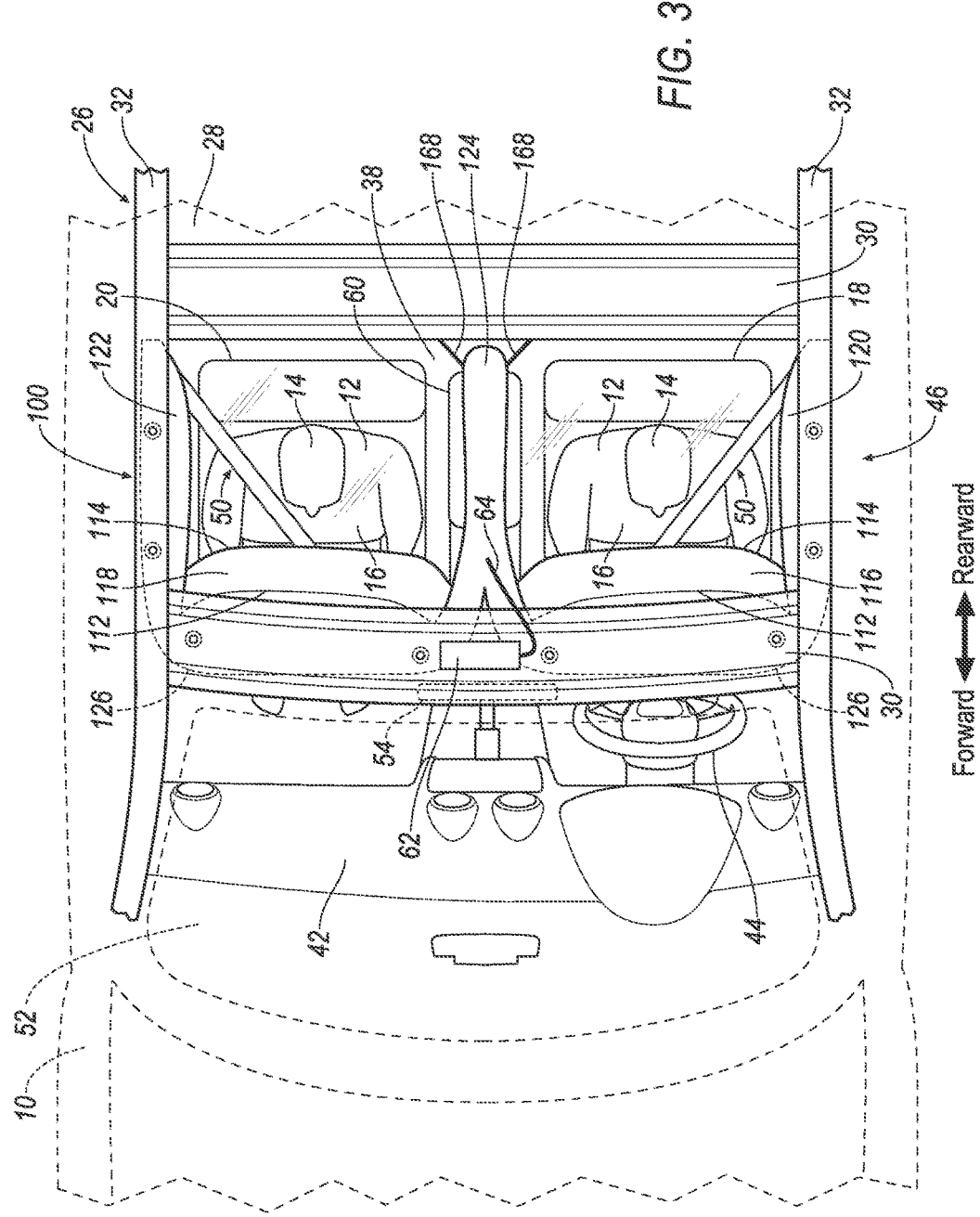

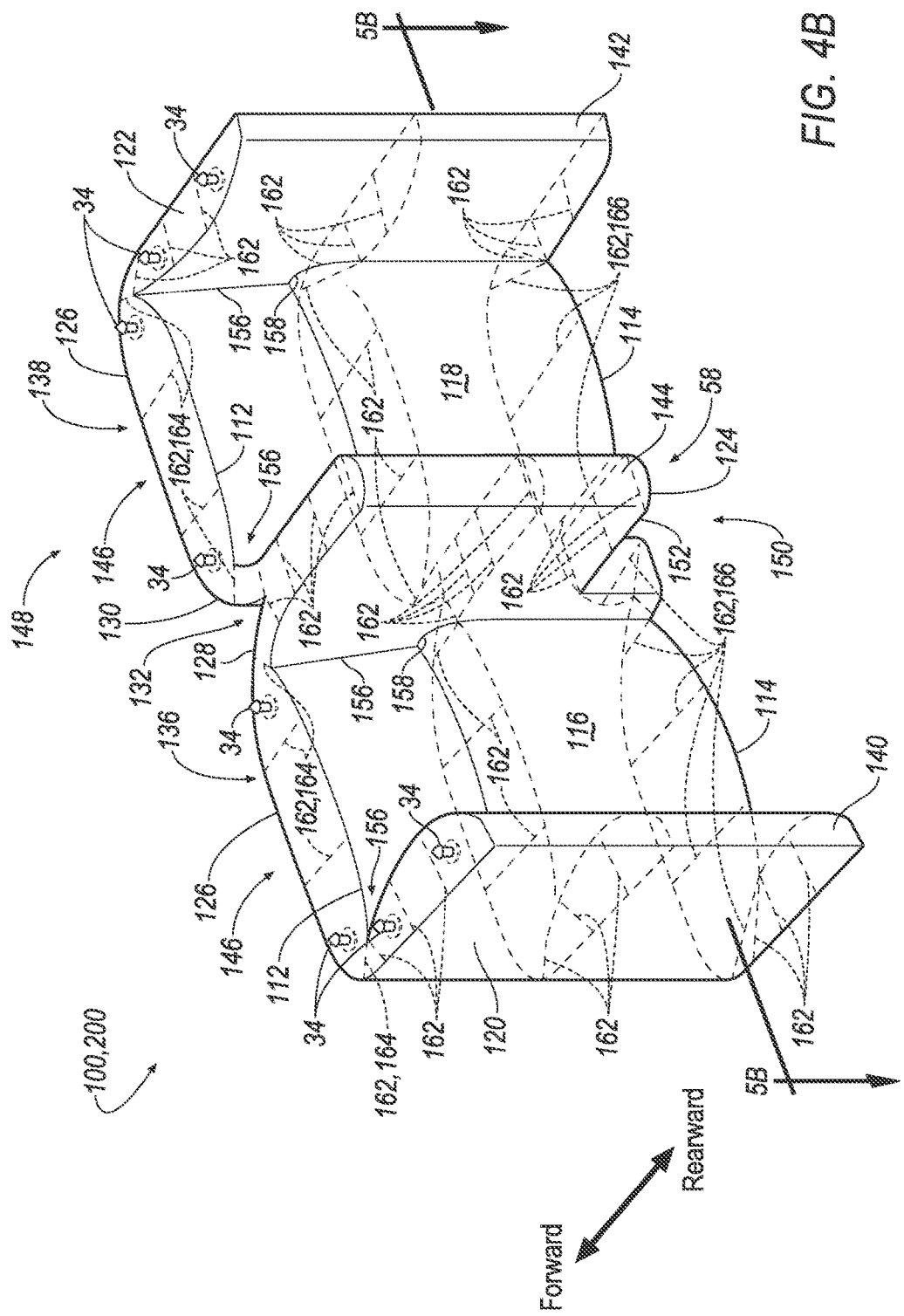

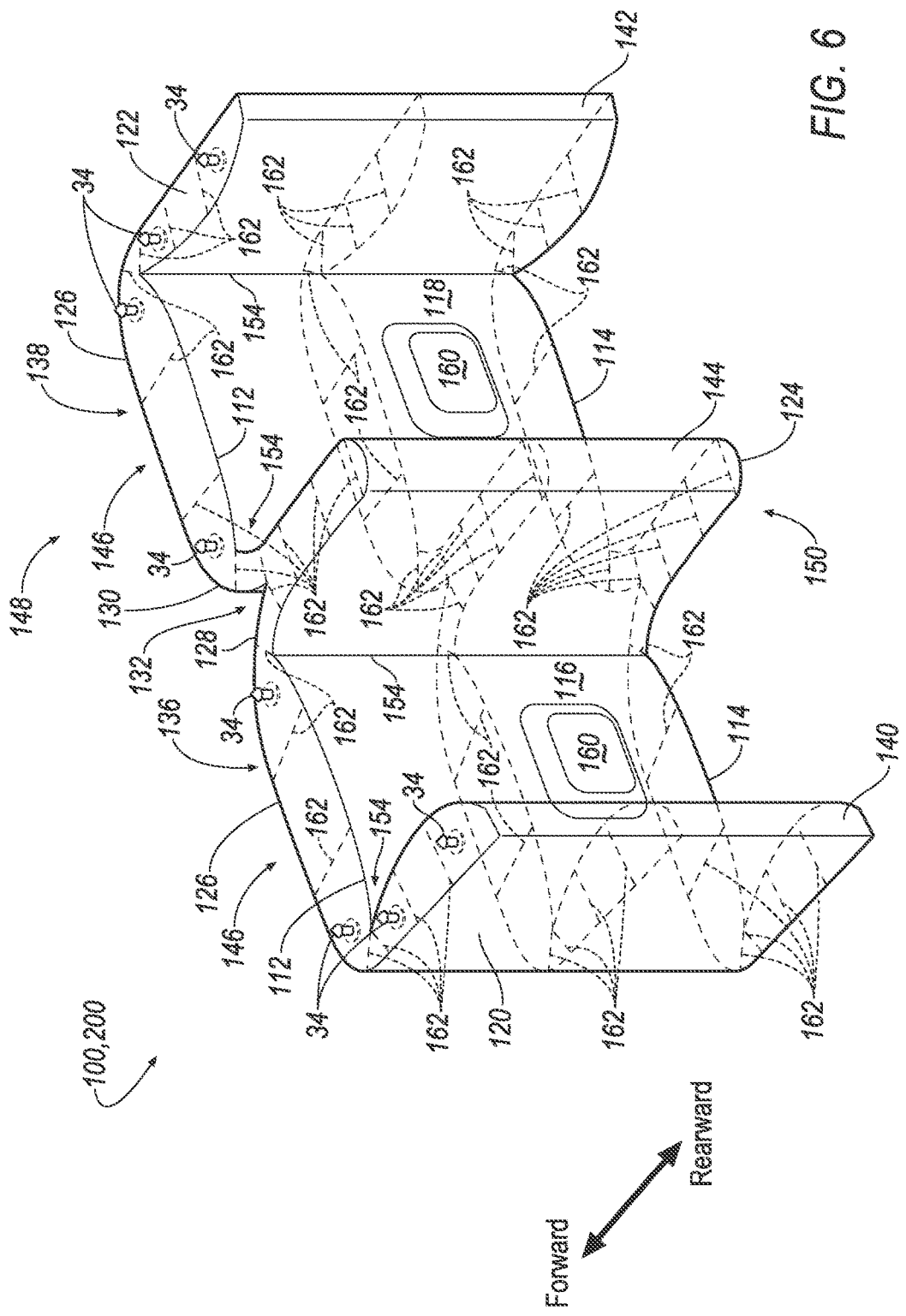

VEHICLE IMPACT ABSORBING SYSTEM INCLUDING CHEST LOAD REDUCTION

BACKGROUND

An interior of a vehicle, such as an automobile, may include various safety devices for absorbing energy from an occupant of the vehicle during an impact of the vehicle. For example, the vehicle may include an airbag affixed in a steering wheel, an instrument panel, atop a vehicle door, and/or above or in a center console. The airbag may be configured to absorb energy and soften impact between the body of the occupant and vehicle interior components, as well as between the occupants colliding with one another.

Automobiles are subject to a variety of crash tests, including standard tests regulated by the National Highway Traffic Safety Administration (NHTSA). For example, these tests may be directed toward full frontal impacts, oblique impacts, i.e., impacts that occur at an angle of 10-50 degrees relative to a vehicle's trajectory, side impacts, rollovers, etc. During a frontal or oblique impact, the occupant may move forward and laterally, and a seat belt may impart a load onto a chest of the occupant.

Several types of information are measured during crash tests, including airbag performance, test dummy reaction, etc. One type of measurement is the Brain Injury Criteria (BrIC) values during the impact. The BrIC values characterize occupant movement in particular angular velocities of the head. Occupants may move toward a vehicle pillar, e.g., an A-pillar, toward the centerline of the vehicle, toward the steering wheel, and toward the instrument panel.

BRIEF DESCRIPTION OF THE DRAWINGS

FIG. 3 is a top view of a portion of the vehicle including crossmembers and side rails of a roof of the vehicle and the airbag mounted to the crossmembers and the side rails in the inflated position.

FIG. 4B is a perspective view of another embodiment of the airbag in the inflated position.

FIG. 6 is a perspective view of another embodiment of the airbag in the inflated position.

DETAILED DESCRIPTION

Figure 4A:
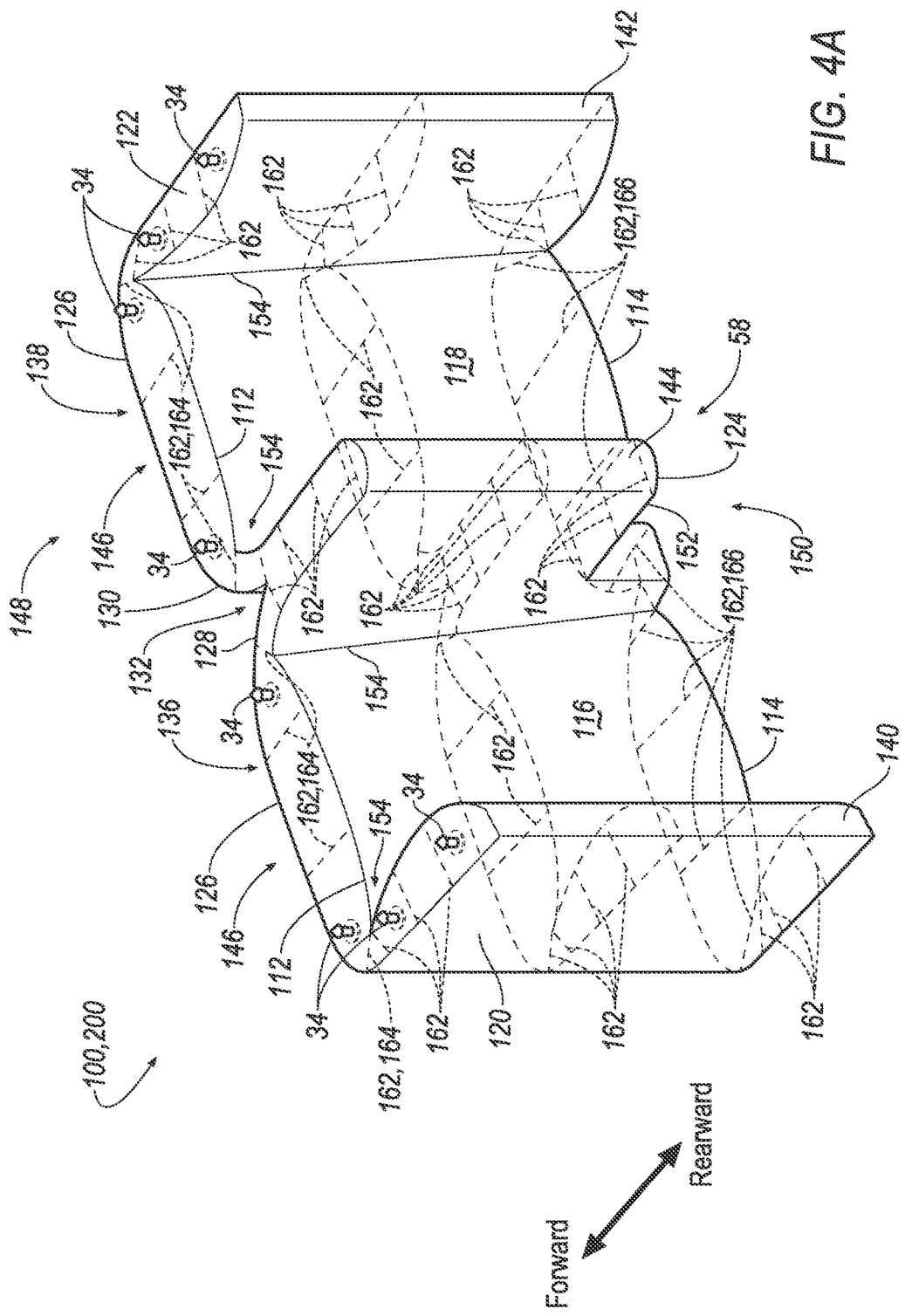
FIG. 4A is a perspective view of the airbag in the inflated position.

With reference to the Figures, wherein like numerals indicate like parts throughout the several views, an airbag 100, 200 for a vehicle 10 includes a top 112 a bottom 114, a first panel 116, and a second panel 118 spaced from the first panel 116. The airbag 100, 200 includes a first leg 120, a second leg 122, and a middle leg 124. The first leg 120 extends from the first panel 116 in a rearward direction. The second leg 122 extends from the second panel 118 in the rearward direction. The middle leg 124 extends from the first panel 116 and the second panel 118 in the rearward direction. With reference to FIGS. 3 and 4A-4B, the first panel 116 and the second panel 118 each slant in the rearward direction along a direction from the top 112 to the bottom 114 of the airbag 100, 200.

Figure 1:
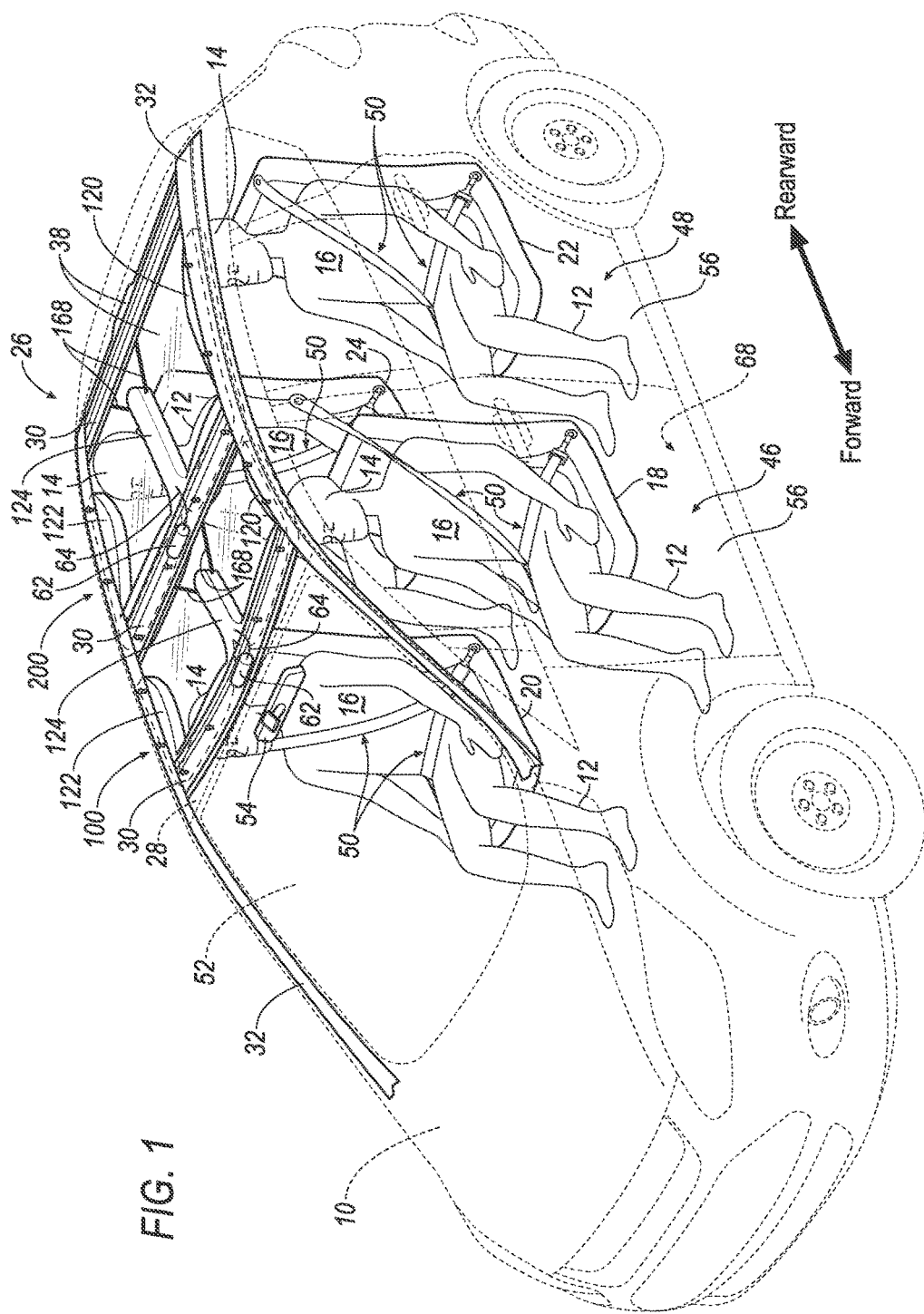
FIG. 1 is a perspective view of a vehicle including an airbag and a rear airbag in an uninflated position.
Figure 2:
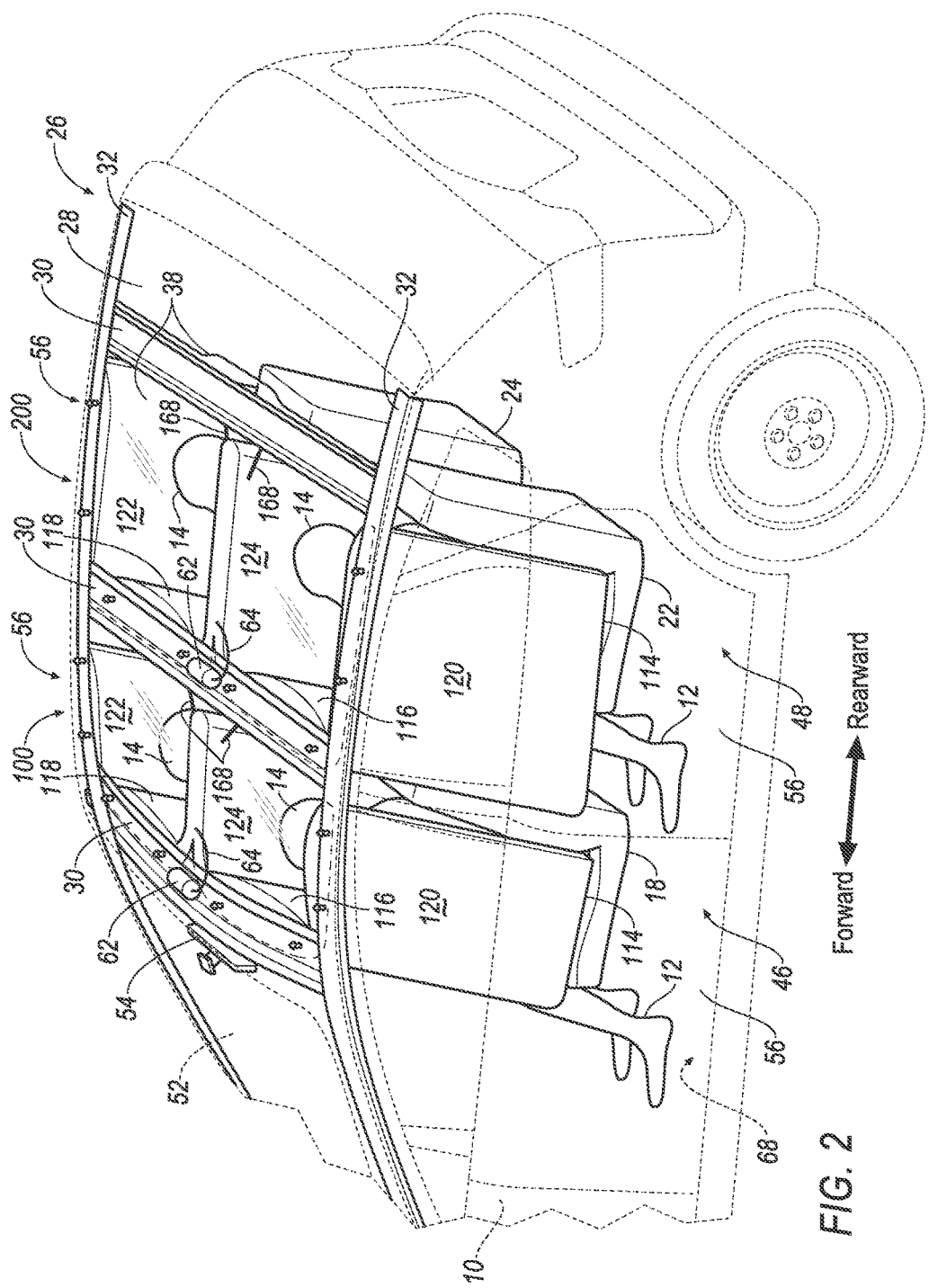
FIG. 2 is a perspective view of the vehicle including the airbag and the rear airbag in an inflated position.

During a sensed impact of the vehicle 10, the airbag 100, 200 may be inflated from an uninflated position, as shown in FIG. 1, to an inflated position, as shown in FIGS. 2-3 to assist in cushioning occupants 12 seated in the vehicle 10. In particular, the middle leg 124 extends downwardly between the occupants 12, and the first leg 120 and the second leg 122 inflate downwardly on opposite sides of the occupants 12. Since the first panel 116 and the second panel 118 slant toward the occupants 12 along the direction from the top 112 to the bottom 114 of the airbag 100, 200, as shown in FIGS. 3 and 4A-4B, the first panel 116 leaves room for a head 14 of the occupant 12 while limiting the forward movement of a chest 16 of the occupant 12, e.g., during a frontal, or an oblique impact. Accordingly, the first panel 116 and the second panel 118 urge the occupants 12 to remain upright during the impact event, reducing loading on the chest 16 of the occupants 12 from the seat belt.

The airbag 100, 200 may enclose the occupants 12 against a seat 18, 20, 22, 24, e.g., a driver may be enclosed between the first panel 116, the first leg 120, and the middle leg 124; and/or a passenger may be enclosed between the second panel 118, the middle leg 124 and the second leg 122. Accordingly, the airbag 100, 200 may absorb energy from occupants 12 during an impact event. Specifically, the airbag 100, 200 in the inflated position may absorb energy from the occupants 12 from a variety of impact scenarios, e.g., frontal impact, side impacts, rollovers, and oblique impacts. The airbag 100, 200 may reduce or eliminate the use of other airbags, such as the driver airbag (DAB), passenger airbag (PAB), side airbag (SAB), curtain airbag (CAB), and center console airbags, which may reduce cost while increasing vehicle packaging efficiency.

The vehicle 10 may, for example, include two airbags 100, 200, as shown in FIGS. 1 and 2, i.e., a front airbag 100 and a rear airbag 200. Common numerals are used to identify common features in the front airbag 100 and the rear airbag 200. As set forth further below, the vehicle 10 may include front seats 18, 20 and rear seats 22, 24. The front airbag 100 may inflate adjacent the front seats 18, 20, and the rear airbag 200 may inflate adjacent the rear seats 22, 24. The vehicle 10 may, alternatively, include any suitable number of airbags.

The vehicle 10 may be any passenger or commercial vehicle including car, truck, sport utility vehicle, crossover vehicle, or the like. The vehicle 10, for example, may be an autonomous vehicle. The Society of Automotive Engineers (SAE) has defined multiple levels of autonomous vehicle operation. At levels 0-2, a human driver monitors or controls the majority of the driving tasks, often with no help from the vehicle 10. For example, at level 0 ("no automation"), a human driver is responsible for all vehicle operations. At level 1 ("driver assistance"), the vehicle 10 sometimes assists with steering, acceleration, or braking, but the driver is still responsible for the vast majority of the vehicle control. At level 2 ("partial automation"), the vehicle 10 can control steering, acceleration, and braking under certain circumstances without human interaction. At levels 3-5, the vehicle 10 assumes more driving-related tasks. At level 3 ("conditional automation"), the vehicle 10 can handle steering, acceleration, and braking under certain circumstances, as well as monitoring of the driving environment. Level 3 requires the driver to intervene occasionally, however. At level 4 ("high automation"), the vehicle 10 can handle the same tasks as at level 3 but without relying on the driver to intervene in certain driving modes. At level 5 ("full automation"), the vehicle 10 can handle almost all tasks without any driver intervention. The vehicle 10 may operate in one or more of the levels of autonomous vehicle operation.

Figure 7:
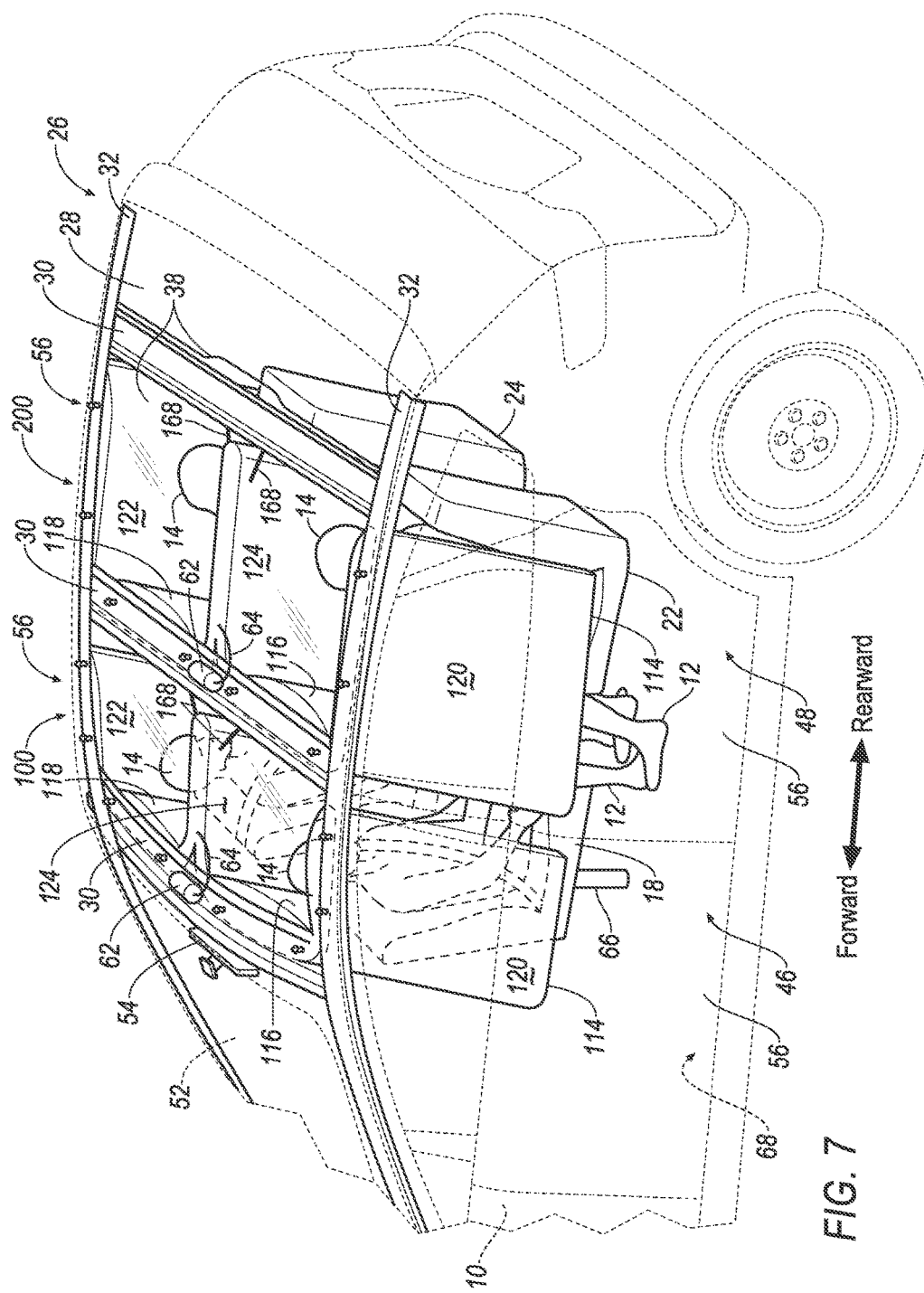
FIG. 7 is a perspective view of a vehicle with front seats facing in a rearward direction.

With reference to FIGS. 1, 2 and 7, the vehicle 10 includes a floor 68. The seat 18, 20, 22, 24 may be mounted to the floor 68. As one example, the front seats 18, 20 may be rotatably coupled to the floor 68. For example, as shown in FIG. 7, the front seats 18, 20 include mounting posts 66 rotatably coupling the front seats 18, 20 to the floor 68 of the vehicle 10. As one example, the mounting posts 66 are coupled to the front seats 18, 20 and extend from the front seats 18, 20 to the floor 68 to support the front seats 18, 20 on the floor 68. The mounting posts 66 may include a system of parts such as a shaft, a bearing, a gear, etc. The mounting post 66 may be rotatable relative to the floor 68 and/or relative to the front seats 18, 20. The front seats 18, 20 may be rotatable relative to the floor 68 in any suitable degree of rotation, e.g., 360 degrees. As one example, in configurations where the vehicle 10 is autonomous, during autonomous operation of the vehicle 10, the front seats 18, 20 may be rotated to face the rear seats 22, 24, as shown in FIG. 7. The mounting posts 68 allow the occupants 12 seated in the front seats 18, 20 to rotate the front seats 18, 20 to a preferred orientation within the vehicle 10.

With continued reference to FIG. 7, the occupants seated in the front seats 18, 20 are enclosed between the front airbag 100 and the rear airbag 200. For example, one occupant 12 may be enclosed between the first and middle legs 120, 124 of the front airbag 100, and, as set forth below, a back panel 126 of the rear airbag 200; and/or another occupant 12 may be enclosed between the second and middle legs 122, 124 of the front airbag 100, and the back panel 126 of the rear airbag 200. The front seats 18, 20 in the configuration shown in FIG. 7, the rear airbag 200 may absorb energy from the occupants 12 seated in the front seats 18, 20 during, e.g., a rear impact. The rear airbag 200 in the inflated position may separate the occupants 12 seated in the front seats 18, 20 from the occupants 12 seated in the rear seats 22, 24. The occupants 12 of the front seats 18, 20 and the rear seats 22, 24 may act as reaction surfaces for the rear airbag 200 during, e.g., occupant rebound after an impact event.

With reference to FIGS. 1-3, the vehicle 10 includes a roof 26. The roof 26 includes a roof panel 28 and structural components, e.g., crossmembers 30, and side rails 32. The crossmembers 30 may be spaced from each other and fixed to the side rails 32. The vehicle 10 may include any suitable number of crossmembers 30, for example, the vehicle 10 includes three crossmembers 30 in FIGS. 1-3.

The airbag 100, 200 may be supported by the roof 26, i.e., may be connected to one of the crossmembers 30 and to the side rails 32, as shown in FIGS. 1-3. The front airbag 100 may, for example, be connected to the crossmember 30 referred to as the "windshield header." With reference to FIG. 2, the airbag 100, 200 may be inflatable away from the roof 26, the crossmembers 30, and the side rails 32, e.g., in a downward direction, to the inflated position.

The airbag 100, 200 may be supported by the roof 26, e.g., the crossmembers 30 and the side rails 32, in any suitable manner. For example, the airbag 100, 200 may include clips 34, as shown in FIGS. 4A-4B, 5A and 6, engaged with the crossmembers 30, as shown in FIGS. 1-3. The clips 34 may be of any suitable type, e.g., fasteners, Christmas tree clips, pins, etc. Alternatively, the airbag 100, 200 may be directly attached to the roof 26 by, e.g., adhesive.

The vehicle 10 may include a headliner 38 adjacent to the roof 26. The headliner 38 may be of any suitable construction and may be formed of any suitable material, e.g., foam, thermoplastic, and/or other polymeric material.

The airbag 100, 200 may be disposed between the roof 26 and the headliner 38 in the uninflated position, as shown in FIG. 1. Specifically, in the uninflated position, the airbag 100, 200 may be folded and/or rolled between the roof 26 and the headliner 38.

Figure 5A:
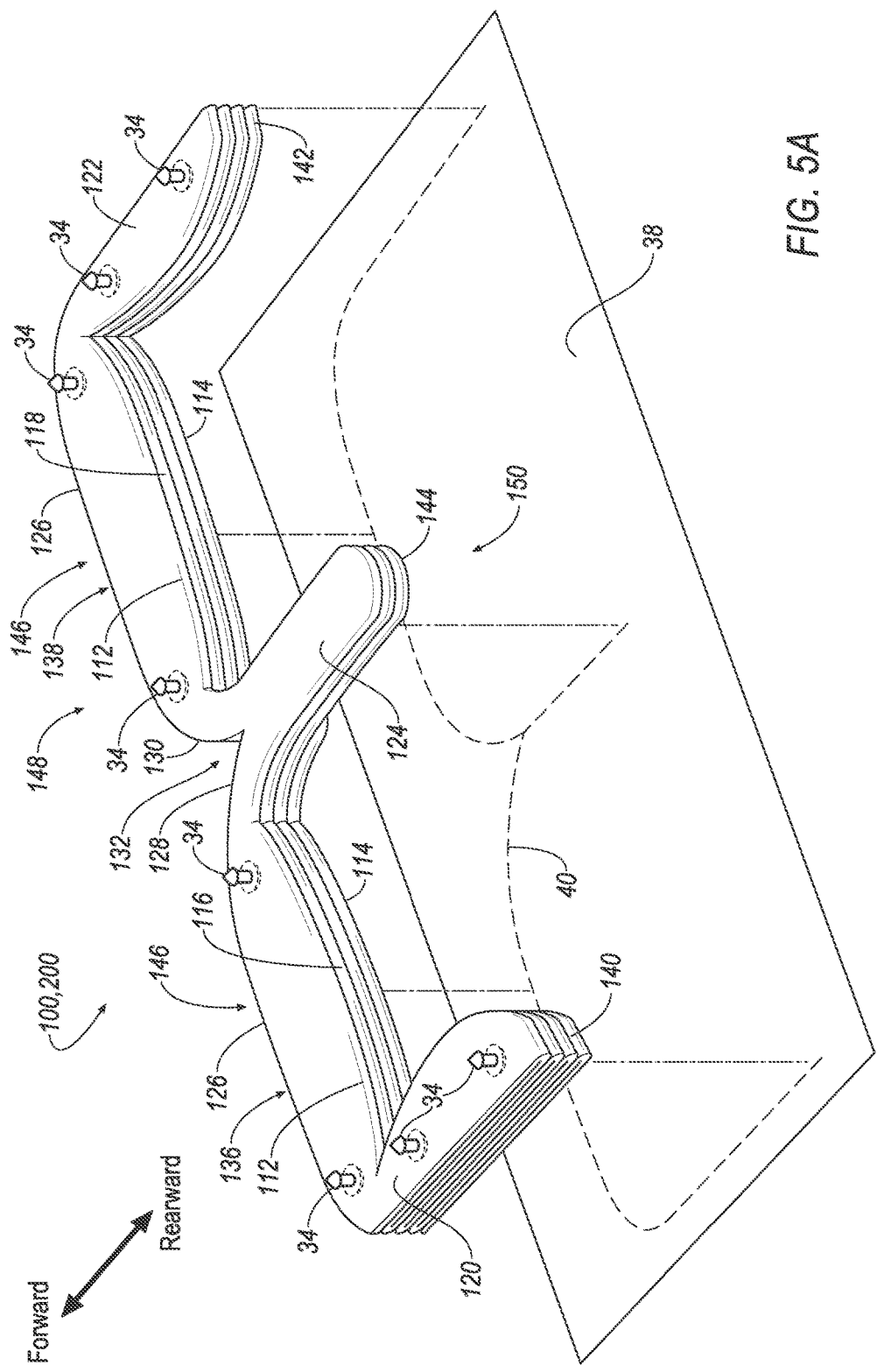
FIG. 5A is an exploded perspective view of the airbag in the uninflated position and a headliner.

The airbag 100, 200 may inflate downwardly from the headliner 38, as shown in FIG. 2. As shown in FIG. 5A, the headliner 38 may include a frangible seam 40. The airbag 100, 200 may be disposed between the frangible seam 40 and the roof 26 in the uninflated position. Upon inflation of the airbag 100, 200, the airbag 100, 200 may break the headliner 38 at the frangible seam 40, and may protrude through the frangible seam 40 to the inflated position, as shown in FIG. 2. The frangible seam 40 may be formed by weakened regions, formed by partially cutting, or otherwise weakening the headliner 38 locally allowing the airbag 100, 200 to extend from the headliner 38 upon a force of inflation.

With reference to FIG. 3, the vehicle 10 may include an instrument panel 42 and a steering wheel 44 extending in the rearward direction from the instrument panel 42. The front airbag 100 may extend between the steering wheel 44 and the front seats 18, 20 to receive the occupants 12 during the impact event. In the inflated position, the bottom 114 of the front airbag 100 may be disposed below the steering wheel 44, such that the entire steering wheel 44 may be disposed between the instrument panel 42 and the first panel 116 of the front airbag 100. In the inflated position, the front airbag 100 abuts the instrument panel 42 and/or the steering wheel 44, which acts as a reaction surfaces for the front airbag 100.

As set forth above, the vehicle 10 includes a first seat 18, 22 and a second seat 20, 24. For example, the vehicle 10 may include a first front seat 18 and a second front seat 20, and may include a first rear seat 22 and a second rear seat 24. With reference to FIGS. 1-3, the first and second front seats 18, 20 may be arranged in a front row 46, and the first and second rear seats 22, 24 may be arranged in a rear row 48. Alternatively, the vehicle 10 may include any number of seats in any suitable position, and any of the seats may be arranged in one or more rows.

Each of the seats 18, 20, 22, 24 may include a seat belt assembly 50 for retaining the occupant 12 in the seat 18, 20, 22, 24. The seat belt assembly 50 may be of any suitable type.

With reference to FIGS. 4A-6, and as set forth above, the airbag 100, 200 may include the back panel 126. The back panel 126 may extend from the first leg 120 to the second leg 122. The back panel 126 is spaced from the first panel 116 and the second panel 118 in a forward direction opposite the rearward direction in the inflated position. In the front airbag 100, when in the inflated position, the first panel 116 is between the first front seat 18 and the back panel 126, and the second panel 118 is between the second front seat 20 and the back panel 126. In the rear airbag 200, when in the inflated position, the first panel 116 is between the first rear seat 22 and the back panel 126, and the second panel 118 is between the second rear seat 24 and the back panel 126.

With reference to FIGS. 4A-6, in the uninflated and the inflated position, the back panel 126 may include a first portion 128 adjacent the first panel 116, and a second portion 130 adjacent the second panel 118. The back panel 126 may include a notch 132 between the first portion 128 and the second portion 130. The first portion 128 and the second portion 130 may extend from the top 112 to the bottom 114.

The vehicle 10 may include a windshield 52 and a rear view mirror 54 supported by the windshield 52, and the notch 132 may receive the rear view mirror 54 when the airbag 100, 200 is in the inflated position.

Figure 5B:
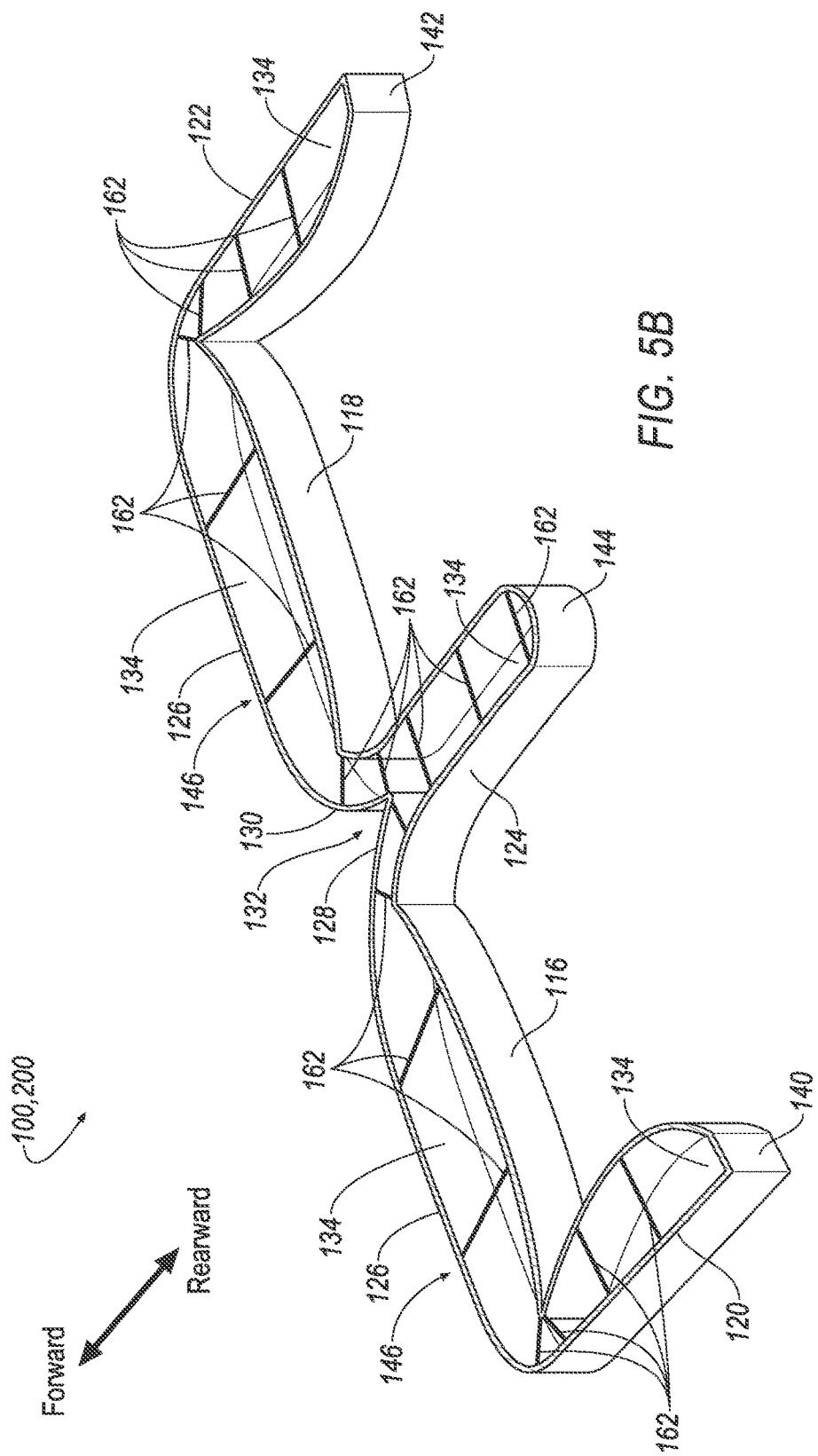
FIG. 5B is a perspective view of a cross-sectional segment of the airbag along line 5 of FIG. 4B.

The airbag 100, 200 includes an inflation chamber 134 (numbered in FIG. 5B). The inflation chamber134 may be defined between the back panel 126, the first panel 116, the second panel 118, the first leg 120, the second leg 122, and the middle leg 124. The back panel 126, the first panel 116, the second panel 118, the first leg 120, the second leg 122, and the middle leg 124 may enclose the inflation chamber 134 from the top 112 to the bottom 114, and the inflation chamber 134 may be vented through any of those components.

With reference to FIGS. 4A-6, the airbag 100, 200 may include a first cushion 136 and a second cushion 138. The first cushion 136 includes the first panel 116 and the back panel 126 between the first leg 120 and the middle leg 124. The second cushion 138 includes the second panel 118 and the back panel 126 between the middle leg 124 and the second leg 122.

The airbag 100, 200 may be W-shaped in the uninflated position and in the inflated position. The first leg 120, the second leg 122, and the middle leg 124 may each include a distal end 140, 142, 144 spaced from the first panel 116 and second panel 118, as shown in FIGS. 4A-6. Specifically, the first leg 120 may extend from the first panel 116 to the distal end 140 of the first leg 120; the second leg 122 may extend from the second panel 118 to the distal end 142 of the second leg 122; and the middle leg 124 may extend from the first panel 116 and second panel 118 to the distal end 144 of the middle leg 124. In the front airbag 100, the first leg 120, the second leg 122, and the middle leg 124 extend from the first and second panels 116, 118 toward the front seats 18, 20. In the rear airbag 200, the first leg 120, the second leg 122, and the middle leg 124 extend from the first and second panels 116, 118 toward the rear seats 22, 24.

With reference to FIGS. 2-6, the distal ends 140, 142, 144 of each of the first leg 120, the second leg 122, and the middle leg 124 may be in a common plane. At least a portion 146 of the back panel 126 may lie in a plane parallel to the common plane of the distal ends 140, 142, 144.

As another example, the distal end 140 of the first leg 120 and the distal end 142 of the second leg 122 may be in the common plane, and the distal end 144 of the middle leg 124 may be offset from the common plane. For example, a length of the first leg 120 from the first panel 116 to the distal end 140 of the first leg 120 is greater than a length of the middle leg 124 from the first panel 116 to the distal end 144 of the middle leg 124; and a length of the second leg 122 from the second panel 118 to the distal end 142 of the second leg 122 is greater than a length of the middle leg 124 from the second panel 118 to the distal end 144 of the middle leg 124. The distal end 144 of the middle leg 124 may be offset from the common plane, as shown in Figure 4A-4B, to accommodate for obstacles in the vehicle 10, e.g., a center console, a center armrest, etc.

As set forth above, the airbag 100, 200 includes the top 112 and the bottom 114. The first leg 120, the second leg 122, the middle leg 124, the first panel 116, the second panel 118, and the back panel 126 extend from the top 112 to the bottom 114 in the inflated position. The first leg 120, the second leg 122, the middle leg 124, the first panel 116, second panel 118, and the back panel 126 may define a top surface 148 of the airbag 100, 200 at the top 112, and may define a bottom surface 150 of the airbag 100, 200 at the bottom 114. The top surface 148 and the bottom surface 150 may be parallel to each other.

The first leg 120 and the second leg 122 may each extend along doors 56 of the vehicle 10 in the inflated position. The first leg 120 and the second leg 122 may absorb energy from the occupants 12 during an impact event using the doors 56 as reaction surfaces during, for example, a side and/or oblique impact event.

The middle leg 124 may be inflatable between the seats 18, 20, 22, 24. Specifically, the middle leg 124 may separate occupants 12 of the first seat 18, 22 and the second seat 20, 24 during an impact event of the vehicle 10. The occupants 12 may act as reaction surfaces for the middle leg 124, e.g., a side and/or oblique impact event.

The middle leg 124 may include a lower end 152 between the top 112 and the bottom 114. With reference to FIGS. 4A and 4B, for example, the first leg 120 and the second leg 122 each may extend from the top 112 to the bottom 114 in the inflated position, and the middle leg 124 may extend from the top 112 to the lower end 152. As set forth below, the airbag 100, 200 includes a cutout 58 between the lower end 152 of the middle leg 124 and the bottom 114 of the airbag 100, 200. The vehicle 10 may include a center console 60, and the cutout 58 may receive the center console 60 in the inflated position. As one example, the center console 60 may be adjacent the front seats 18, 20, e.g., between the first front seat 18 and the second front seat 20. As another example, the center console 60 may be adjacent the rear seats 22, 24, e.g., between the first rear seat 22 and the second rear seat 24. As other examples, the cutout 58 may accommodate for any obstacle in the vehicle 10, e.g., a center armrest, etc.

The first leg 120, the second leg 122, and the middle leg 124 may be parallel to each other. In other words, the first leg 120, the second leg 122, and the middle leg 124 may be parallel to each other as the first leg 120, the second leg 122, and the middle leg 124 extend from the first panel 116 and the second panel 118 in the rearward direction.

As set forth above, and shown in FIGS. 3-4B, in the inflated position, the first panel 116 and the second panel 118 may slant toward the first seats 18, 22 and second seats 20, 24, respectively, i.e., in the rearward direction, along the direction from the top 112 to the bottom 114 of the airbag 100, 200. In other words, the first panel 116 and the second panel 118 at the bottom 114 of the airbag 100, 200 may be closer to the first seats 18, 22 and second seats 20, 24, respectively, than the first panel 116 and the second panel 118 at the top 112 of the airbag 100, 200. As shown in FIG. 3, for example, the first panel 116 and the second panel 118 at the bottom 114 of the front airbag 100 are closer to the chest 16 of the occupants 12, which may urge the occupants 12 to remain upright during an impact event, reducing loading on the chest 16 of the occupants 12 from the seat belt assembly 50.

With reference to FIG. 4A and 6, the intersection between the first panel 116 and the first leg 120 and middle leg 124 may extend along straight lines 154. Similarly, the intersection between the second panel 118 and the second leg 122 and middle leg 124 may extend along straight lines 154. Alternatively, as shown in FIG. 4B, the intersection between the first panel 116 and the first leg 120 and middle leg 124 may extend along arced lines 156. Similarly, the intersection between the second panel 118 and the second leg 122 and middle leg 124 may extend along arced lines 156. In other words, as shown in FIG. 4B, the first panel 116 and the second panel 118 may include convex portions 158, or may be convex from the top 112 to the bottom 114. This shape may maximize head space for the head 14 of the occupant 12 and chest 16 support to urge the occupant 12 to remain upright.

As another example, as shown in FIG. 6, the first panel 116 and the second panel 118 may be vertical, i.e., do not slant in the rearward direction. With continued reference to FIG. 6, the airbag 100, 200, in the inflated position, may include at least one protruded chamber 160 extending rearwardly, i.e., toward the seats 18, 20, 22, 24. The protruded chamber 160 is in communication with the inflation chamber 134. As one example, the first panel 116 may include at least one protruded chamber 160 between the first leg 120 and the middle leg 124, and/or the second panel 118 may include at least one protruded chamber 160 between the middle leg 124 and the second leg 122. The protruded chamber 160 may extend from the top 112 to the bottom 114, or the protruded chamber 160 may be spaced from the top 112 and/or the bottom 114. The protruded chamber 160 may be positioned to leave room for the head 14 of the occupant 12 while limiting the forward movement of a chest 16 of the occupant 12. Accordingly, the protruded chamber 160 may urge the occupants 12 to remain upright during the impact event, reducing loading on the chest 16 of the occupants 12 from the seat belt assembly 50. While the protruded chamber 160 is shown in the embodiment of FIG. 6, it should be appreciated that the embodiments of the airbag 100, 200 shown in FIGS. 4A and 4B, i.e., with the first panel 116 and the second panel 118 slanting, may include the protruded chambers 160.

As shown in FIGS. 4A-4B, 5B and 6, the airbag 100, 200 may include tethers 162. The tethers 162 may extend from the back panel 126 to the first panel 116 and to the second panel 118, and the tethers 162 may extend across the first leg 120, across the second leg 122, and across the middle leg 124. The tethers 162 may be arranged such that the first cushion 136 and the second cushion 138 bulge in the middle of the first and second cushion 136, 138. In other words, the tethers 162 toward the middle of the first and second cushion 136, 138 may be longer than the tethers 162 spaced farther from the middle of the first and second cushion 136, 138. In addition to, or in the alternative, the tethers 162 extending across the first leg 120, the second leg 122, and/or the middle leg 124 may be shorter than the tethers 162 in the first cushion 136 and the second cushion 138 to allow the first cushion 136 and second cushion 138 to be thicker than the first leg 120, the second leg 122, and the middle leg 124.

The tethers 162 in the first cushion 136 and the second cushion 138 may be upper tethers 164 and lower tethers 166 between the upper tethers 164 and the bottom 114. As shown in FIGS. 4A-4B, for example, the lower tethers 166 may be longer than the upper tethers 164 to allow the first and second panel 116, 118 to slant in the rearward direction, as described above.

The vehicle 10 may include at least one external tether 168 extending from the roof 26 to the airbag 100, 200. Specifically, the external tethers 168 may be fixed to the roof 26 and to the first leg 120, the second leg 122, and/or the middle leg 124 to provide additional support to the airbag 100, 200 and to position the first leg 120, the second leg 122, and the middle leg 124.

As another example, the distal ends 140, 142, 144 of the first leg 120, the second leg 122, and/or the middle leg 124 may be directly attached, e.g., clipped, to one of the crossmembers 30 disposed in a vehicle-rearward direction from the first panel 116 and the second panel 118.

The airbag 100, 200 may be formed of a woven polymer or any other material. As one example, the airbag 100, 200 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. The tethers 162 and/or the external tethers 168 may be formed of the same type of material as the airbag 100, 200 or from any other suitable type of material.

As shown in FIGS. 1-3, the airbag 100, 200 may include an inflator 62 in fluid communication with the inflation chamber 134 of the airbag 100, 200. The inflator 62 expands the airbag 100, 200 with an inflation medium, such as a gas, to move the airbag 100, 200 from the uninflated position to the inflated position. The inflator 62 may be, for example, a pyrotechnic inflator that uses a chemical reaction to drive the inflation medium into the airbag 100, 200. Alternatively, the inflator 62 may be, for example, a cold-gas inflator that, when activated, ignites a pyrotechnic charge that creates an opening for releasing the pressurized inflation medium to the airbag 100, 200 via a fill tube 64. Alternatively, the inflator 62 may be of any suitable type, for example, a hybrid inflator.

The inflator 62 may be mounted to the crossmembers 30, side rails 32, etc. The vehicle 10 may include one or more inflators 62. The inflator 62 may include one or more fill tubes 64, and the fill tubes 64 may be connected to the inflation chamber 134.

The airbag 100, 200 may be a component of an airbag system (not shown) including an impact detection system. For example, the impact detection system may include impact sensors that sense an impact of the vehicle 10. The impact detection system includes a controller, e.g., a computer, that, based on a signal from the impact sensors indicating a sensed impact, may send a signal to one or more inflators 62 to trigger inflation of the front airbag 100 and/or the rear airbag 200 in response to a sensed impact. The impact detection system may sense the type of impact, e.g., based on direction, magnitude, etc., and may trigger inflation of the front airbag 100 and/or the rear airbag 200 in response to the type of impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag comprising:
a top and a bottom;
first and second panels spaced from each other;
a first leg extending from the first panel in a rearward direction;
a second leg extending from the second panel in the rearward direction; and
a middle leg extending from the first and second panels in the rearward direction;
the first and second panels each slanting in the rearward direction along a direction from the top to the bottom;
a back panel extending from the first leg to the second leg, the back panel spaced from the first and second panels in a forward direction opposite the rearward direction;
wherein each of the first leg, the second leg, and the middle leg extend to a distal end spaced from the first and second panels in the rearward direction, the back panel being parallel with the distal ends.

2. The airbag as set forth in claim 1, wherein the middle leg, the first, and the second leg each extend from the top to the bottom.

3. The airbag as set forth in claim 1, wherein the first and second legs each extend from the top to the bottom, and the middle leg has a lower end between the top and the bottom, the middle leg extending from the top to the lower end.

4. The airbag as set forth in claim 1, wherein the distal end of the middle leg, the first leg, and the second leg are each spaced from the first and second panels in the rearward direction, the distal ends of the first and second legs being in a common plane.

5. The airbag as set forth in claim 1, wherein the distal ends of the middle leg, the first leg, and the second leg are each spaced from the first and second panels in the rearward direction, wherein a length of the first leg from the first panel to the distal end of the first leg is greater than a length of the middle leg from the first panel to the distal end of the middle leg, and wherein a length of the second leg from the second panel to the distal end of the second leg is greater than a length of the middle leg from the second panel to the distal end of the middle leg.

6. The airbag as set forth in claim 1, wherein the first and second panels are parallel to each other.

7. The airbag as set forth in claim 1, wherein the first leg, the second leg, and middle leg are parallel to each other.

8. The airbag as set forth in claim 1, further comprising upper tethers extending from the back panel to the first and second panels, and lower tethers extending from the back panel to the first and second panels, the lower tethers being between the upper tethers and the bottom, and the lower tethers being longer than the upper tethers.

9. The airbag as set forth in claim 1, wherein the back panel includes a first portion opposite the first panel across an inflation chamber, a second portion opposite the second panel across the inflation chamber, and a notch between the first portion and the second portion.

10. A vehicle comprising:
a first seat and a second seat;
an airbag inflatable to an inflated position and including a first panel and a second panel spaced from each other and spaced from the first and second seats in the inflated position;
the airbag in the inflated position including a first leg extending from the first panel in a rearward direction toward the first seat, a second leg extending from the second panel in the rearward direction toward the second seat, and a middle leg extending from the first and second panels in the rearward direction toward the first and second seats;
the airbag in the inflated position including a top and a bottom, the first panel slanting in the rearward direction toward the first seat along a direction from the top to the bottom, and the second panel slanting in the rearward direction toward the second seat along a direction from the top to the bottom; and
a back panel extending from the first leg to the second leg, the back panel spaced from the first and second panels in a forward direction opposite the rearward direction;
wherein each of the first leg, the second leg, and the middle leg extend to a distal end spaced from the first and second panels in the rearward direction, the back panel being parallel with the distal ends.

11. The vehicle as set forth in claim 10, further comprising a center console between the first and second seat, and the middle leg includes a cutout receiving the center console in the inflated position.

12. The vehicle as set forth in claim 10, further comprising a headliner adjacent the bottom of the airbag when the airbag is in an uninflated position, the headliner including a frangible seam configured to break when the airbag is inflated from the uninflated position to the inflated position.

13. The vehicle as set forth in claim 10, wherein the back panel includes a first portion opposite the first panel across an inflation chamber, a second portion opposite the second panel across the inflation chamber, and a notch between the first portion and the second portion.

14. The vehicle as set forth in claim 13, wherein the first portion and the second portion extend from the top to the bottom.

15. The vehicle as set forth in claim 13, further comprising a windshield and a rear view mirror supported by the windshield, the notch receiving the rear view mirror when the airbag is in the inflated position.

16. The vehicle as set forth in claim 10, further comprising a roof supporting the airbag, and further comprising an external tether extending from the roof to the airbag.

17. The vehicle as set forth in claim 10, wherein the distal ends of the first and second legs being in a common plane.

18. The vehicle as set forth in claim 10, wherein the distal ends of the middle leg, the first leg, and the second leg are between the first and second panels and the first and second seats, wherein a length of the first leg from the first panel to the distal end of the first leg is greater than a length of the middle leg from the first panel to the distal end of the middle leg, and wherein a length of the second leg from the second panel to the distal end of the second leg is greater than a length of the middle leg from the second panel to the distal end of the middle leg.

19. An airbag comprising:
a top and a bottom;
first and second panels spaced from each other;
a first leg extending from the first panel in a rearward direction;
a second leg extending from the second panel in the rearward direction;
a middle leg extending from the first and second panels in the rearward direction;
the first and second panels each slanting in the rearward direction along a direction from the top to the bottom; and
a back panel extending from the first leg to the second leg, the back panel spaced from the first and second panels in a forward direction opposite the rearward direction;
wherein the back panel includes a first portion opposite the first panel across an inflation chamber, a second portion opposite the second panel across the inflation chamber, and a notch between the first portion and the second portion.

* * * * *